J. MATTERN.
HARROW.
APPLICATION FILED MAY 20, 1909.
933,719.
Patented Sept. 7, 1909.
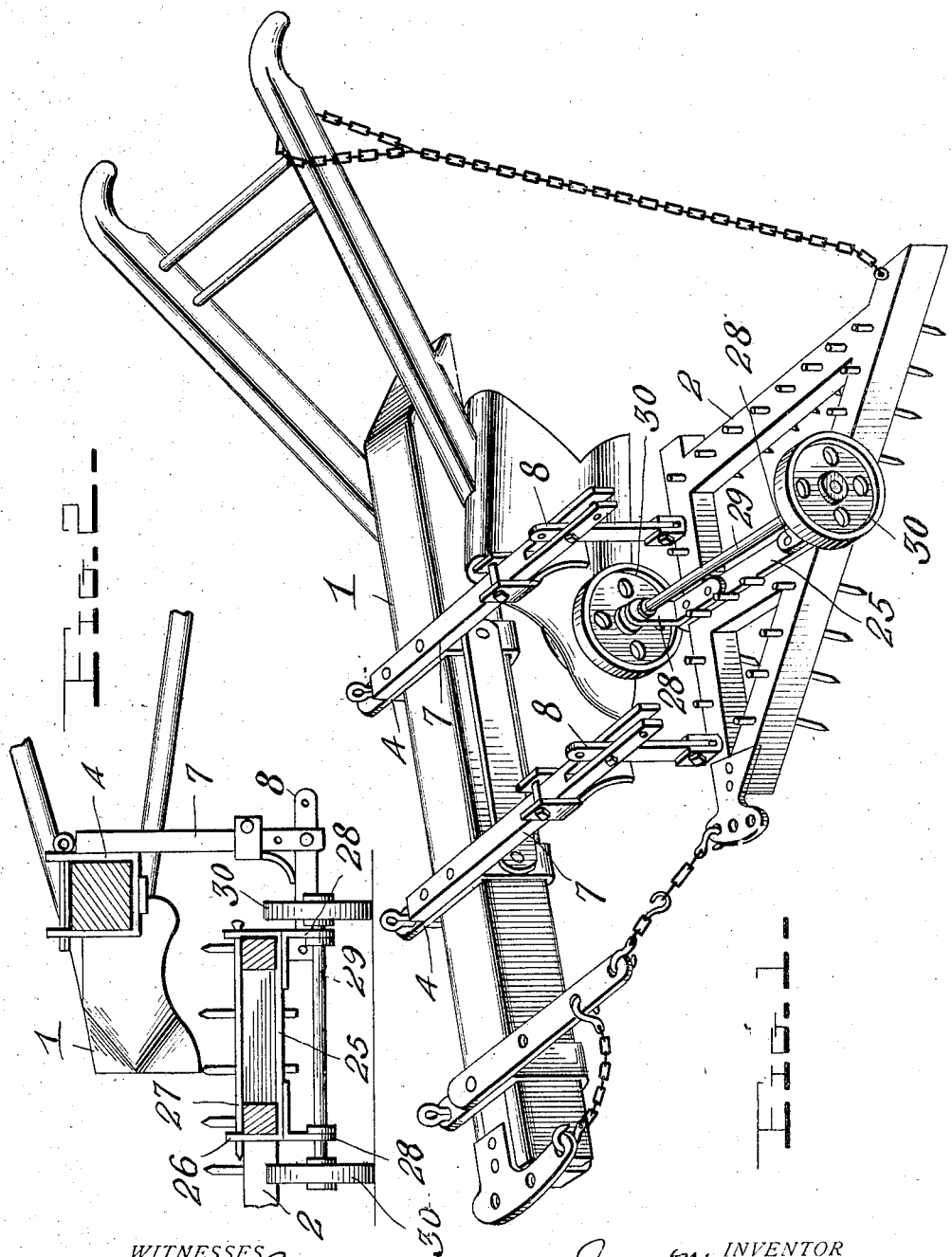

UNITED STATES PATENT OFFICE.

JESSE MATTERN, OF TYRONE, PENNSYLVANIA.

HARROW.

933,719.   Specification of Letters Patent.   Patented Sept. 7, 1909.

Original application filed April 3, 1909, Serial No. 487,724. Divided and this application filed May 20, 1909.
Serial No. 497,180.

*To all whom it may concern:*

Be it known that I, JESSE MATTERN, a citizen of the United States, residing at Tyrone, in the county of Blair and State of Pennsylvania, have invented certain new and useful Improvements in Harrows, of which the following is a specification, reference being had to the accompanying drawings.

This invention relates to improvements in harrows and more particularly to a wheeled support therefor.

The object of the invention is to provide a simple and practical wheeled support which may be attached to the top of a harrow so that when the latter is inverted it may be readily moved over a road or from place to place in a field, and so that a plow or other implement with which the harrow is used, may be also carried upon the harrow when it is inverted.

With the above and other objects in view, the invention consists of the novel features of construction and the combination and arrangement of parts hereinafter fully described and claimed, and illustrated in the accompanying drawings, in which—

Figure 1 is a perspective view of the invention applied to a harrow which is used in connection with a plow; and Fig. 2 is a vertical cross sectional view showing the harrow in inverted position to be supported by the wheeled support or carriage and with the plow folded over upon it.

In the drawings 1 denotes a plow of ordinary construction and 2 denotes a harrow which may be of any form and construction but, as illustrated, is of triangular shape having connected beams provided with depending harrow teeth. The harrow, as here shown, is connected to the plow beam by my improved harrow attachment or connection, shown and described in my pending application for patent, Serial Number 487,724, filed April 3, 1909. This connection comprises horizontal arms 7 connected by clamps 4 to the beam of the plow and having their outer ends connected by links 8 to the harrow, such connection permitting the harrow to be inverted and the plow to be placed upon it, when so inverted, as shown in Fig. 2.

My improved wheeled support or carriage for the harrow, which forms the subject matter of the present application, comprises a frame 25 of substantially U-shape adapted to straddle the harrow and have the ends of its arms 26 united by a transverse rod 27 whereby the device is securely fastened to the harrow. Fixed to the bar 25 are angle brackets 28 which serve as bearings for a transverse axle 29 carrying supporting wheels 30. The device is applied to the harrow so that the wheels project above the top of the same and are adapted to support the harrow when the latter is inverted, as shown in Fig. 2.

While I have shown and described my improved wheeled support or carriage for a harrow as applied to one used as an attachment to a plow or the like, it will be understood that the invention may be used upon a harrow of other form and construction. It will also be understood that slight changes may be made within the spirit and scope of the invention.

Having thus described the invention, what is claimed is:

1. The combination with a harrow, of a substantially U-shape frame to straddle the top of the harrow, means for securing said frame thereon, bearings in said frame, an axle in said bearings, and supporting wheels upon said axle, said wheels projecting above the top of the harrow and adapted to support the latter when it is inverted.

2. The combination with a plow, of a harrow, a wheeled support arranged upon the top of the harrow, and connections between the latter and the plow whereby the harrow may be inverted and supported on said wheels and the plow swung over and supported on the harrow when so inverted.

In testimony whereof I hereunto affix my signature in the presence of two witnesses.

JESSE MATTERN.

Witnesses:
W. M. PARKER,
W. N. BEAM.